United States Patent
Pratt

(10) Patent No.: US 6,285,315 B1
(45) Date of Patent: Sep. 4, 2001

(54) POSITIONING SYSTEMS

(75) Inventor: Anthony Richard Pratt, Rugby (GB)

(73) Assignee: Symmetricom, Inc., Palo Alto, CA (US)

( * ) Notice: Subject to any disclaimer, the term of this patent is extended or adjusted under 35 U.S.C. 154(b) by 0 days.

(21) Appl. No.: 09/314,260

(22) Filed: May 18, 1999

(30) Foreign Application Priority Data

Feb. 16, 1999 (GB) .................................................. 9903521

(51) Int. Cl.[7] .............................. G01S 5/02; H04B 7/185; G01C 21/00; G06G 7/78
(52) U.S. Cl. ................................ 342/357.09; 342/357.1; 342/357.12; 701/215
(58) Field of Search ........................... 342/357.09, 357.1, 342/357.12, 357.15, 357.03, 358; 455/456; 701/215

(56) References Cited

U.S. PATENT DOCUMENTS

| 5,379,224 | * | 1/1995 | Brown et al. | 701/215 |
| 6,002,363 | * | 12/1999 | Krasner | 342/357.1 |
| 6,118,977 | * | 9/2000 | Vannucci | 455/12.1 |

FOREIGN PATENT DOCUMENTS

| 0902300 A2 | 3/1999 | (EP) | G01S/5/14 |
| 2308033 A | 11/1997 | (GB) | G01S/5/14 |
| 110023690 | 1/1999 | (JP) | G01S/5/14 |
| WO 94/15412 | 7/1994 | (WO) | G01S/5/02 |
| WO 97/33382 A1 | 9/1997 | (WO) | G01S/5/02 |
| WO 98/09181 A2 | 3/1998 | (WO) | G01S/5/14 |

* cited by examiner

Primary Examiner—Thomas H. Tarcza
Assistant Examiner—Fred H Mull
(74) Attorney, Agent, or Firm—Kilpatrick Stockton LLP

(57) ABSTRACT

A satellite-based positioning system includes at least one mobile station (11) and a terrestrial station (10), which may be a cellular telephone base station and is arranged to receive ephemeris data from each in-view positioning satellite. The ephemeris data is processed in a processor (14) to provide processed data which defines the satellite orbit in Cartesian form. Processed data is transmitted over a short message service channel to each mobile receiver (11), which includes also a positioning system receiver (25). The mobile receiver (11) is able to determine its position from the processed data and from signals received from positioning satellites with reduced processing, and thus reduced power consumption and/or time, than previous mobile receivers. The terrestrial station (10) may operate as a reference receiver which modifies the processed data to correct for errors in the ephemeris data and/or atmospheric propagation effects and/ or the effects of selective availability.

19 Claims, 2 Drawing Sheets

| Data Description | Reference Frame | Designation | No. of bytes |
|---|---|---|---|
| Unique time tag | Time of year | T | 4 bytes |
| Satellite position | WGS 84 ECEF | x,y,z | 4 bytes each axis |
| Satellite velocity | WGS 84 ECEF | $x^I, y^I, z^I$ | 4 bytes each axis |
| Satellite acceleration | WGS 84 ECEF | $x^{II}, y^{II}, z^{II}$ | 4 bytes each axis |
| Satellite jerk | WGS 84 ECEF | $x^{III}, y^{III}, z^{III}$ | 2 bytes each axis |
| Satellite clock offset including relativistic corrections | GPS time | | 4 bytes |
| Satellite clock drift including rate of change of relativistic effects | GPS time | | 2 bytes |
| Space vehicle no. | | SV | 1 byte |
| Source identification | | ID | 1 byte |
| User range accuracy | | URA | 1 byte |
| Total | | | 55 bytes |

FIG.2.

POSITIONING SYSTEMS

FIELD OF THE INVENTION

The present invention relates to positioning systems using radio-frequency signal transmitting orbiting satellites.

BACKGROUND OF THE INVENTION

A receiver of a satellite based positioning system obtains measured data from a plurality of orbiting satellites by observing the transmission delay between the emission of the radio signals from the satellites and their reception at the mobile receiver or, more particularly, an antenna of the mobile receiver. The position of the device which is to be determined is commonly referred to as a 'mark'. Each receiver is equipped to receive and process the radio frequency signals. For a receiver to be able to estimate the position of the mark, certain requirements need to be met. Although the particular requirements depend on the particular type of positioning system, both knowledge of the orbits of several satellites and radio frequency signals from the orbiting satellites is required for all types of positioning system. The other requirements which may need to be met depend on the type of positioning system.

Knowledge of the orbits of each of several satellites is necessary if the method used to estimate the location of the mark is based on triangulation using estimates of the distance from each satellite to the mark. Knowledge of the orbit of each satellite is required so that the position of each one can be determined at the time of transmission of each of the radio frequency signals used for distance measurement. This is normally provided in mathematical form, valid within certain accuracy limits for a specific period of time.

Dissemination of the orbital data is usually in the form of a model and by way of data transmission from the satellite itself. Other techniques are known such as the publication of precise orbit data some time later, or transmission over a terrestrial data link. In any case, a format for the data is usually sought which provides a balance between complexity, accuracy and the duration of the applicability or validity of the orbital model.

The parameters used in such models are ephemeral. For ideal satellite bodies in orbit above a single, perfectly spherical, uniform host (planet), the orbits described would be exactly elliptical. These orbits would, in principle, persist for long periods of time. In practice, however, the satellite is subject to influences other than the obvious gravitational and centripetal forces. These include but are not limited to: the effects of other (celestial) bodies, such as the Sun, the Moon and other planets; the solar wind, which is the result of a stream of particles continuously emitted from the Sun; gravitational anomalies caused by the non-uniformity of the Earth; and the effects of a non-spheroidal Earth-the Earth is approximately an oblate spheroid.

Consequently, it is practical to provide models, which are each valid for limited periods of time, covering the orbit of a satellite in a series of segments. Such time variable parameters for an orbit description have become known as ephemeris models. The balance of complexity for such models is carefully judged and depends on many application sensitive factors including the work load necessary for maintenance of the ephemeris models. These balances are frequently optimised for the most efficient data transmission from the satellites, but may not be optimised for other applications or data links.

The ephemeris data for a GPS satellite is contained in a data message of 1500 bits length, transmitted over a period of 30 seconds, of which approximately 900 are involved in the description of the ephemeris model. These 900 bits are referred as ephemeris data.

The ephemeris data is valid for typically one or two hours, depending on the factors influencing the orbit of the satellite.

It is proposed in U.S. Pat. No. 5365450 to include in a positioning system using radio-frequency signal transmitting, orbiting satellites, a terrestrial station which receives ephemeris data from all "in-view" satellites and transmits the ephemeris data to a mobile station on a cellular telephone channel. The data is transmitted over the cellular telephone channel much more quickly than it is transmitted by the satellites, allowing the mobile station to more rapidly determine its position than previously.

It is an object of the present invention to provide an improved satellite orbital model transmission format for elements of a positioning system in which the data link is a terrestrial data link.

SUMMARY OF THE INVENTION

According to a first aspect of the present invention, there is provided a method of determining the position of a mobile station, comprising: receiving at a terrestrial station ephemeris data from each of a plurality of satellites, the ephemeris data being indicative of the orbit of the respective satellite; processing the ephemeris data to provide processed data which is indicative of the orbit of the respective satellite but is in such a form that less subsequent processing of the data is required to determine the information about the orbit of the satellite which is required to perform position determination; transmitting the processed data; receiving the processed data at the mobile station; and using the processed data at the mobile station in conjunction with signals received at said mobile station from the associated satellites to determine the position.

The processing of the ephemeris data may include a co-ordinate conversion process. In this case, the processed data preferably use a co-ordinate system to indicate the orbit of the satellite such that no co-ordinate conversion process is required when using the processed data at the mobile station to determine the position. The processed data may define the orbit of the respective satellite in Cartesian form.

The processed data preferably includes a time tag which is indicative of the time from which the processed data is valid or the time until which the processed data is valid.

According to second aspect of the present invention, there is provided a mobile receiver comprising: a first receiver channel for receiving positioning signals from a plurality of positioning satellites; a second receiver channel for receiving processed ephemeris data from a terrestrial station; and a processor connected to the first and second receivers and arranged to use the positioning signals in conjunction with the processed ephemeris data to compute an output representative of the position of the mobile receiver, wherein the second receiver channel and the processor are arranged respectively to receive and process the processed ephemeris data in a form in which the orbits of the satellites are so defined that the amount of processing required in the processor to generate the information about the satellite orbits which is needed to compute the output is less than that which would be required if the ephemeris data were received from the terrestrial station in the form transmitted by the satellites.

The processed ephemeris data is preferably in such a form that the processor does not need to perform a co-ordinate conversion process to compute the output. In this case, the processor is preferably arranged to process the processed data received from the terrestrial station with the satellite orbit defined in Cartesian form.

The processor may be arranged to detect a time tag in the processed ephemeris data and to determine the position of the mobile receiver only if the time tag indicates the data to be valid for the time at which the computations are made.

The second receiver channel may be a radio telephone receiver. In this case, the receiver preferably further comprises a transmitter for requesting processed ephemeris data prior to position determination being performed.

According to a third aspect of the present invention, there is provided, for use in a system for determining the position of a mobile receiver, a terrestrial station, comprising: a receiver for receiving ephemeris data from each of a plurality of positioning satellites, the ephemeris data being indicative of the orbit of the respective satellite; a processor arranged to process the ephemeris data to provide processed data which is indicative of the orbit of the respective satellite but is in such a form that less subsequent processing of the data is required to determine the information about the orbit of the satellite which is required to perform position determination; and a transmitter for transmitting the processed data in a form suitable for reception by a mobile receiver.

The processor is preferably arranged to perform a co-ordinate conversion process on the ephemeris data. Here the processor may be arranged to process the ephemeris data so that the processed data defines the satellite orbit in Cartesian form.

The transmitter is preferably a radio telephone base or ground station transmitter. Here the processed data may be transmitted as short message service data. Alternatively or in addition, processed data may be arranged to be transmitted in response to a request received at a radio telephone receiver forming part of the terrestrial station.

The terrestrial station may be operable as a reference receiver arranged to provide processed data which is modified to correct for errors in the ephemeris data and/or atmospheric propagation effects for differential position determination at the mobile receiver.

The invention also includes a positioning system including a terrestrial station broadcasting the processed ephemeris data and one or a plurality of mobile receivers as set out above.

The advantages of using a system having such components or of using such a method may be numerous. As described below, it is possible to construct a receiver in accordance with the present invention which achieves the known advantages of the above mentioned prior art in that both reduced time to position determination from receiver switch on and reduced current consumption is achievable, compared to systems which do not include a terrestrial data link, because the receiver does not need to receive the ephemeris data directly from the satellite. Additionally, the power of the processor in the receiver need not be as great as that of the processor needed to process the raw, unprocessed, ephemeris data. This may result in a reduction in the cost of such receivers and/or a reduction in the power that is consumed by them due to the reduced processing burden. The processed data is likely also to occupy less data bits than the raw ephemeris data. This would result in a shorter transmission time, for a given data rate, when compared to the prior art system described above. In turn, this may allow reduced current consumption in the receiver and/or an increased frequency of transmission of the processed ephemeris data so that the mean time taken to perform position determination from receiver switch-on is reduced.

BRIEF DESCRIPTION OF THE DRAWINGS

An embodiment of the present invention will now be described by way of example only with reference to the accompanying drawings of which:

FIG. 2 is a state table constituting processed ephemeris data.

DETAILED DESCRIPTION OF THE PREFERRED EMBODIMENTS

Figure 1:
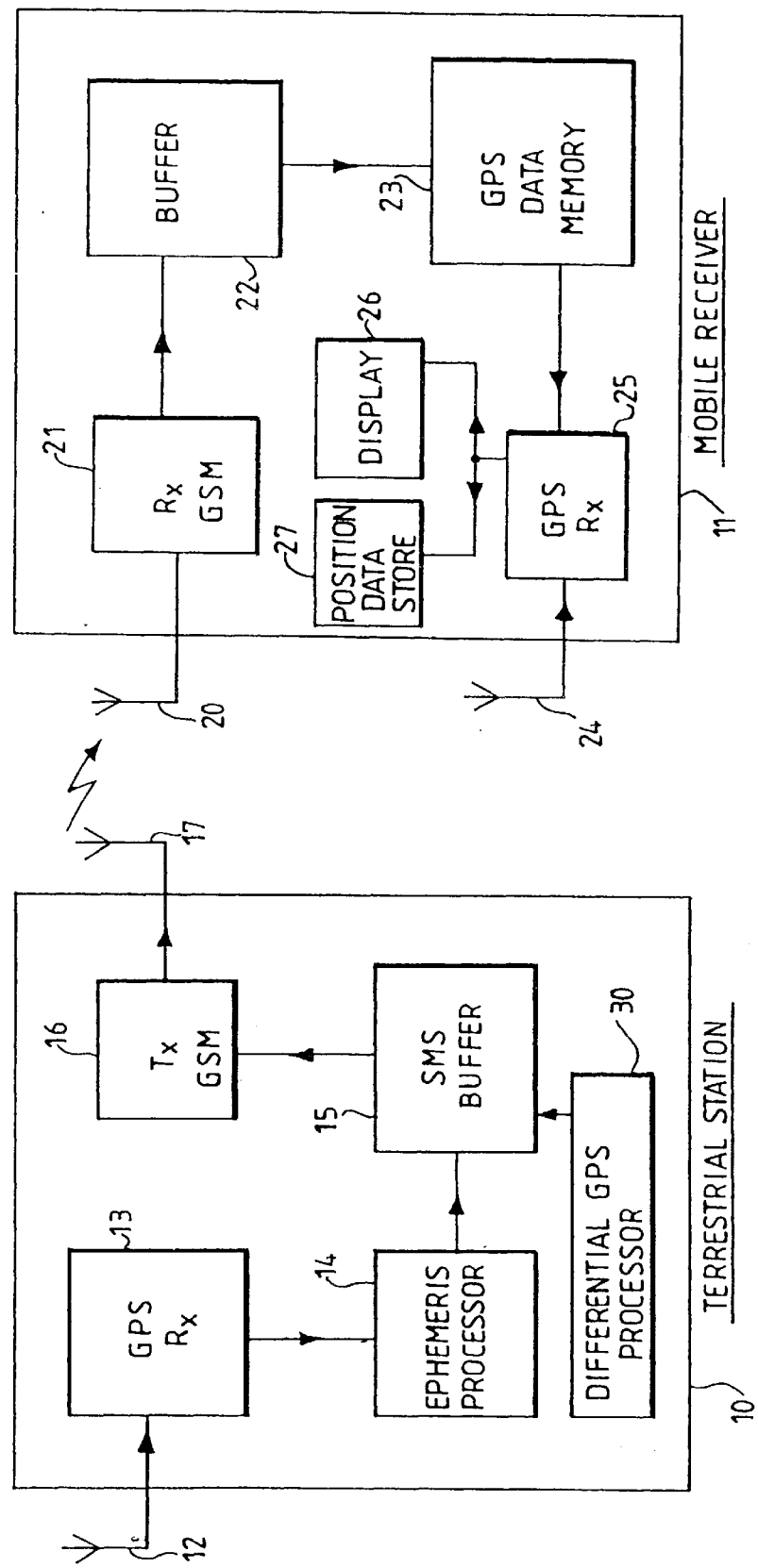
FIG. 1 is a block diagram of a mobile telephone system incorporating a terrestrial station and a mobile receiver in accordance with this invention.

Referring to FIG. 1, a mobile telephone system has a terrestrial station 10 and a mobile receiver 11. The terrestrial station 10 is in this embodiment a GSM cellular telephone base station, although it could equally well be any other kind of ground station. The terrestrial station 10 comprises a GPS (Global Positioning System) antenna 12, a GPS receiver 13, an ephemeris data processor 14, a SMS (short message service) buffer 15, a GSM transmitter 16 and a GSM transmitting antenna 17. The mobile receiver 11, which in this embodiment is a mobile telephone handset although it could equally well be any kind of mobile receiver, comprises a GSM receiving antenna 20, a GSM receiver 21, a buffer 22, a GPS data memory 23, a GPS antenna 24 and a GPS receiver and processor 25.

The GPS receiver 13 of the terrestrial station 10 is arranged to monitor continuously signals transmitted by GPS satellites which are "in-view", that is satellites which are in the field of view of the GPS antenna 12. Thus, the GPS receiver 13 receives periodically the 1500 data bits, including the ephemeris data, for each in-view satellite and stores this data in an internal memory (not shown). The 1500 bits of data are updated for each satellite each time the satellites transmit their ephemeris data, i.e. it is the most recently received data for each satellite which is stored in the internal memory.

The ephemeris data contains satellite orbit information using a Keppler orbit description. The ephemeris data thus includes: issue of data, ephemeris (IODE) (1 byte); the amplitude of the sine harmonic correction term to the orbit radius (2 bytes); the mean motion difference from computed value (2 bytes); the mean anomaly at the reference time (4 bytes); the amplitude of the cosine harmonic correction term to the argument of latitude (2 bytes); the eccentricity (4 bytes); the amplitude of the sine harmonic correction term to the argument of latitude (2 bytes); the square root of the semi-major axis (4 bytes); the reference time, ephemeris (2 bytes); the amplitude of the cosine harmonic correction term to the angle of inclination (2 bytes); the longitude of the ascending node of the orbit plane at the weekly epoch (4 bytes); the amplitude of the sine correction term to the angle of inclination (2 bytes); the inclination angle at reference time (4 bytes); the amplitude of the cosine harmonic correction term to the orbit radius (2 bytes); the argument of the perigee (4 bytes); the rate of right ascension (3 bytes); and the rate of inclination angle (IDOT) (14 bits). Elements of the co-ordinate system are set out in Annex A, Appendix 3 of GPS STANAG 4294 (Edition 1) (see A-3–27).

The ephemeris data processor 14 receives from the GPS receiver 13 the ephemeris data for each satellite in turn, and processes the ephemeris data to provide for each satellite a state table as shown in FIG. 2.

From FIG. 2, it will be seen that the ephemeris data has been processed into such a form that it defines the satellite orbit in a Cartesian co-ordinate system. The steps performed at the terrestrial station include, therefore, acquisition of signals from each in view satellite, code and carrier tracking, demodulation of the transmitted data, achieving bit, word, subframe and frame locks, and decoding of ephemeris and clock data for each satellite in view (900 x x bits where x is the number of in view satellites). Next, the location of each satellite is computed, starting from the modified Keppler orbit definition of the satellite data and converting into an earth-centred earth fixed (ECEF) format with, in this instance, Cartesian co-ordinates x, y, z as well as velocity and acceleration, x', y', z', and x", y", z", with a time reference or tag. This processed ephemeris data is set to the transmission buffer (OS1 L7 in the GSM system) or SMS buffer 15.

The processed data occupies 408 bits (55 Bytes) as opposed to the 900 bits which constitute the ephemeris data received from the satellite. However, the processed data defines the satellites orbit for a valid period of only ten or twenty seconds, i.e. the process data cannot be used to determine accurately the position of the mobile receiver after ten or twenty seconds have passed from the time at which the measurement is desired.

Alternatively, the satellite jerk data is omitted and the number of bytes describing the satellite's acceleration is reduced to two per axis. Although this modification results in a small reduction in performance, this may be countered by the fact that the transmitter state table is now contained within 39 bytes. This is approximately one third of the number of data bits contained in each ephemeris data transmission from the satellite.

Referring again to FIG. 1, the processed data is provided to the short message service (SMS) buffer 15 where it is transferred into a format suitable for inclusion in a GSM short message, and is transmitted by way of the transmitter 16 to the mobile receiver 11 as a Subscriber Identity Module (SIM) update. Alternatively, the processed data may be transmitted to the mobile receiver 11 as part of control data in a control channel time slot. Indeed, transmission may be performed at every 'handshake' of cellular telephone control signals between the base station and the mobile receiver, provided either that the state table is valid at the time of transmission or that it is accompanied by a time tag indicating the period of validity. The processor data may be provided instead, only in response to a request from the mobile receiver, in a fax/data operations mode or as an SMS message. To this end, the terrestrial station 10 includes a GSM receiver (not shown). The message length to encompass data for six satellites may be held within 240 bytes and so may be transmitted within typically 250 milliseconds.

The processed data is received in the mobile receiver 11 by the GSM receiver 21 and then applied to the buffer 22, which reassembles the processed data into the GPS data memory 23 in the state table format, from where it can be retrieved by the GPS receiver 25 at any time. In effect, the GSM receiver 21 reads the transmission buffer of the terrestrial station, the processed ephemeris data being read into buffer 22. This data is then processed in the GPS receiver and processor 25 by, firstly, calculating the time difference $\Delta t$ between the 'time now' and the transmitted time reference or tag and computing the satellite location x, y, z for the satellites at 'time now' using $X_U = X_R + X'_R \Delta t + X''_R \Delta t^2 + \ldots$. These locations are used in conjunction with the signals received directly from the satellites via the antenna 24 to triangulate the present mobile receive position, or to connect the 'time now' using Kalman filter techniques. The GPS receiver and processor 25, when controlled to perform a position determining operation, thus reads the processed ephemeris data from the memory 23 and, on determining that the current time is within the period for which the processed data is valid, uses the processed data to compute from signals received at the GPS antenna 24 the position of the mobile receiver 11 as described above. The position thus determined is provided at a display 26 and/or provided to a position data store 27, from where the position can be retrieved as necessary.

Preferably, the terrestrial station 10 transmits to the mobile receiver 11 processed data for only the satellites which are in-view. In this way, the mobile receiver 11 knows what satellites signals may be received from, and so does not waste time and current searching for satellites which are not in-view.

The Global Positioning System currently applies an operation named 'selective availability' (S/A) to its satellites, which introduces an intentional source of error so that mobile receivers cannot accurately determine their location. Whereas, in theory, location can be determined with an accuracy of around 1 cm using these techniques, S/A causes this accuracy to be reduced so that location can be determined only to, in the worst cases, no better than 200 meters. Accuracy of location determination is prejudiced also by extra signal delays caused by irregular atmospheric (ionospheric and tropospheric) propagation of signals from the satellites. To increase accuracy, the terrestrial station further includes a differential GPS processor 30, as is known in the art. There are several different techniques for making position estimates using carrier phase data only, code phase data only or a combination of carrier phase and code phase data. Additional information which is useable to increase measurement accuracy is obtained from the received z-count data, the time of the data bit edges and knowledge of the approximate orbit altitude. The differential GPS processor 30 operates to determine the error due to S/A, atmospheric propagation factors and errors that are contained within the ephemeris data transmitted by the satellites, by comparing the known position with that determined by location determination through the GPS receiver 13, and to correct the transmitter state table accordingly. In this way, the transmitter state table is provided with a description of the satellite orbit which is more accurate than the description contained in the ephemeris data transmitted by that satellite and which compensates also for S/A and atmospheric propagation effects. The mobile receiver 11 can thus determine its location with increased accuracy. This is achieved without any increase in the amount of processing required of the mobile receiver 11.

Instead of WGS 84 ECEF (earth-centred, earth-fixed), other geodetic reference systems could equally well be used—OSGB 36 being an example. Also, the state table need not define the satellite orbit in terms of Cartesian co-ordinates. Instead, skew co-ordinate systems or cylindrical or spherical reference systems could be used, although such may require more processing at the mobile receiver 11.

Furthermore, rather than use a state table, data processed to describe satellite orbit in terms of location and velocity vectors referenced to a specific epoch may be used. Such is used with satellites of the Glonass constellation. A benefit of this system is that the processed data is valid for thirty minutes or so, whilst still occupying only around 400 data bits. However, this alternative requires appropriate software and processing power in the mobile receiver 11 to perform calculations relating to the motion of the satellites caused by the gravitational effects of the sun and the moon. Still furthermore, both GPS and Glonass may be used in a single receiver.

Of course, the claims apply equally to systems using satellites of the Glonass constellation as they do satellites of the GPS constellation.

What is claimed is:

1. A method of determining the position of a mobile station, comprising:

receiving at a terrestrial station ephemeris data from each of a plurality of satellites, the ephemeris data being indicative of the orbit of the respective satellite, processing the ephemeris data to provide processed data which is indicative of the orbit of the respective satellite but is in such a form that less subsequent processing of the data is required to determine the information about the orbit of the satellite which is required to perform position determination;

transmitting the processed data;

receiving the processed data at the mobile station; and using the processed data at the mobile station in conjunction with signals received at said mobile station from the associated satellites to determine the position.

2. A method according to claim 1, wherein the processing of the ephemeris data includes a co-ordinate conversion process.

3. A method according to claim 2, wherein the processed data uses a co-ordinate system to indicate the orbit of the satellite such that no co-ordinate conversion process is required when using the processed data at the mobile station to determine the position.

4. A method according to claim 1, in which the processed data defines the orbit of the respective satellite in Cartesian form.

5. A method according to claim 1, in which the processed data includes a time tag which is indicative of the time from which the processed data is valid or the time until which the processed data is valid.

6. A mobile receiver comprising:

a first receiver channel for receiving positioning signals from a plurality of positioning satellites;

a second receiver channel for receiving processed ephemeris data from a terrestrial station; and a processor connected to the first and second receivers and arranged to use the positioning signals in conjunction with the processed ephemeris data to compute an output representative of the position of the mobile receiver, wherein the second receiver channel and the processor are arranged respectively to receive and process the processed ephemeris data in a form in which the orbits of the satellites are so defined that the amount of processing required in the processor to generate the information about the satellite orbits which is needed to compute the output is less than that which would be required if the ephemeris data were received from the terrestrial station in the form transmitted by the satellites.

7. A receiver according to claim 6, wherein the processed ephemeris data is in such a form that the processor does not need to perform a co-ordinate conversion process to compute the output.

8. A mobile receiver according to claim 7, wherein the processor is arranged to process the processed data received from the terrestrial station with the satellite orbit defined in Cartesian form.

9. A mobile receiver according to claim 6, in which the processor is arranged to detect a time tag in the processed ephemeris data and to determine the position of the mobile receiver only if the time tag indicates the data to be valid for the time at which the computations are made.

10. A mobile receiver according to claim 6, in which the second receiver channel is a radio telephone receiver.

11. A mobile receiver according to claim 10, further comprising a transmitter for requesting processed ephemeris data prior to position determination being performed.

12. For use in a system for determining the position of a mobile receiver, a terrestrial station, comprising:

a receiver for receiving ephemeris data from each of a plurality of positioning satellites, the ephemeris data being indicative of the orbit of the respective satellite;

a processor arranged to process the ephemeris data to provide processed data which is indicative of the orbit of the respective satellite but is in such a form that less subsequent processing of the data is required to determine the information about the orbit of the satellite which is required to perform position determination; and a transmitter for transmitting the processed data in a form suitable for reception by a mobile receiver.

13. A terrestrial station according to claim 12, wherein the processor is arranged to perform a co-ordinate conversion process on the ephemeris data.

14. A terrestrial station according to claim 13, in which the processor is arranged to process the ephemeris data so that the processed data defines the satellite orbit in Cartesian form.

15. A terrestrial station according to claim 12, wherein the transmitter is a radio telephone base or ground station transmitter.

16. A terrestrial station according to claim 15 wherein the processed data is transmitted as short message service data.

17. A terrestrial station according to claim 15, wherein the processed data is arranged to be transmitted in response to a request received at a radio telephone receiver forming part of the terrestrial station.

18. A terrestrial station according to claim 12, operable as a reference receiver arranged to provide processed data which is modified to correct for errors in the ephemeris data and/or atmospheric propagation effects for differential position determination at the mobile receiver.

19. A positioning system having one or more terrestrial stations according to claim 12 and one or more mobile stations according to claim 6.

* * * * *